(12) United States Patent
Downey et al.

(10) Patent No.: US 9,973,300 B2
(45) Date of Patent: May 15, 2018

(54) MODULATION ADAPTION METHOD FOR MULTI-MODE MODEMS

(71) Applicant: Echelon Corporation, San Jose, CA (US)

(72) Inventors: Walter Downey, San Jose, CA (US); Leonid Ovanesyan, San Jose, CA (US)

(73) Assignee: Echelon Corporation, San Jose, CA (US)

( * ) Notice: Subject to any disclaimer, the term of this patent is extended or adjusted under 35 U.S.C. 154(b) by 0 days. days.

(21) Appl. No.: 15/177,343

(22) Filed: Jun. 9, 2016

(65) Prior Publication Data

US 2017/0359145 A1    Dec. 14, 2017

(51) Int. Cl.
*H04L 1/00* (2006.01)
*H04L 27/26* (2006.01)

(52) U.S. Cl.
CPC .......... *H04L 1/0045* (2013.01); *H04L 1/0058* (2013.01); *H04L 1/0061* (2013.01); *H04L 27/2601* (2013.01)

(58) Field of Classification Search
CPC ....................................................... H04L 1/00
USPC ................................ 714/776, 758, 761, 811
See application file for complete search history.

(56) References Cited

U.S. PATENT DOCUMENTS

| | | | | |
|---|---|---|---|---|
| 5,850,406 A | * | 12/1998 | Bes ..................... | H04Q 11/0478 714/811 |
| 2009/0175218 A1 | * | 7/2009 | Song ..................... | H03M 13/271 370/328 |
| 2010/0185920 A1 | * | 7/2010 | Song ..................... | H04L 1/0047 714/758 |

* cited by examiner

*Primary Examiner* — Fritz Alphonse
(74) *Attorney, Agent, or Firm* — Nicholson De Vos Webster & Elliott LLP

(57) ABSTRACT

Systems, methods, and apparatuses are disclosed for choosing the modulation mode using packets transmitted by a sender to a receiver, wherein the packets contain data patterns unknown to the receiver. In some embodiments, the sender sends of a data packet in the most robust mode available, such that the packet can be correctly received by the receiver under even the noisiest conditions. The data contained in the packet is demodulated and decoded. A cyclic redundancy check is performed to ensure that the resultant data is error-free. Once the transmitted payload data is known, the original error coding can be re-applied to the payload data to produce the transmitted bit stream. Comparison of the demodulated bit stream to the regenerated transmitted bit stream yields the pattern of errors. The pattern of errors is analyzed and a higher throughput decoding scheme is chosen based on the results of the analysis.

25 Claims, 4 Drawing Sheets

| 410 | 420 | 430 | 440 | 450 |
|---|---|---|---|---|
| 1 | 0 | 0 | -1 | 1 |
| 6 | 1 | 7 | 1 | 1 |
| 4 | 1 | 7 | 3 | 3 |
| 2 | 0 | 0 | -2 | 2 |
| 0 | 0 | 0 | 0 | 0 |
| 7 | 1 | 7 | 0 | 0 |
| 5 | 1 | 7 | 2 | 2 |
| 3 | 0 | 0 | -3 | 3 |
| 1 | 0 | 0 | -1 | 1 |

Fig. 4

MODULATION ADAPTION METHOD FOR MULTI-MODE MODEMS

BACKGROUND INFORMATION

Modern modems have the ability to automatically adapt the signaling rate based on changing channel conditions. Some channels such as the low voltage power grid have an exceptionally diverse and complex range of impairments that can cripple communication. Conventional methods of adaption require the transmission of known data patterns so that the receiver can compare the received, and presumably impaired, constellation to that of an ideal a priori signal. Such methods waste precious bandwidth and cause latency as they allow only adaption-specific information to be transmitted during the initial learning process. Other adaption methods try to characterize incoming packets by measuring general parameters that affect reception, such as the signal to noise ratio or phase-amplitude deviations of the demodulated constellation. While these adaption methods allow for non-adaption-specific information to be transmitted during the initial adaption process, they often lead to poor modulation mode choices due to the poor estimates provided by performance predictions that are based on general parameters. This is especially true in scenarios where non-Gaussian and non-linear noise are present in the communication channel or medium, such as the case of a low voltage power grid.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 4 illustrates various bit values tracked by the receiver for determining the weakness pattern of a received packet according to an embodiment.

DETAILED DESCRIPTION

Figure 1:
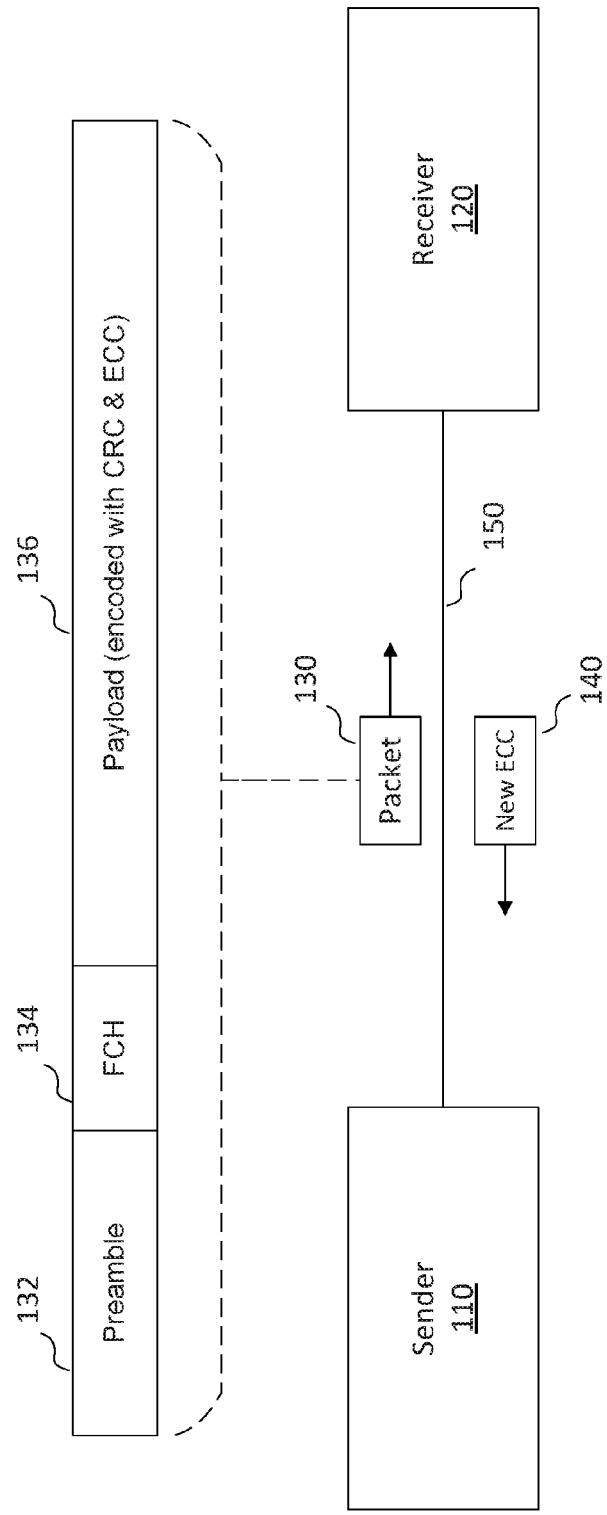
FIG. 1 is a block diagram illustrating an exemplary system implementing the method of modulation adaption in accordance with an embodiment of the present invention.

Described herein are embodiments of a method for choosing an optimal modulation mode based on analyzing packets with unknown data patterns received by a receiver. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. For clarity, individual components in the Figures herein may be referred to by their labels in the Figures, rather than by a particular reference number.

While the following description is generally described in terms of a multi-carrier modulation (MCM) system, it should be noted that aspects may also be implemented in single-carrier modulation systems according to some embodiments. In a MCM communication system such as orthogonal frequency-division multiplexing (OFDM), forward error correction (FEC) encoded payload data is typically modulated onto multiple carriers (e.g., frequencies or channels) using phase and/or amplitude modulation techniques. The use of FEC coding increases the redundancy and thereby increased the energy used per bit of transmitted payload data. FEC coding can be modified and adjusted to accommodate different channel conditions. For instance, more redundancy may be added when the channel is noisy while relatively less redundancy is used when channel is clear. As redundancy increases, the ability to achieve error free reception in noisy conditions (i.e., robustness of the communication) also increases. However, the increase in redundancy brings with it added overhead and reduced the channel throughput. Thus, it is desirable to strike the right balance between data throughput and accuracy, such that the least amount of redundancy in error coding is used while still being able to correct all the errors in the transmitted data. Considerable amount of efforts have been spent on deriving a formula for obtaining the optimum redundancy based on metrics of standard parameters such as signal-to-noise ratio and phase/amplitude deviations. While the methods associated with these approaches are successful when the channel noise is of the standard type, such as Gaussian and linear signals, they do not apply well to other noise types. For channels that contain impairments with complex time-varying noise characteristics or non-linear phase/amplitude modulation transfer functions, such as the ones found in low voltage power grids, these techniques fall short of predicting the optimum error coding method to be used.

It is worth noting that for the case of multicarrier systems, the error correction code (ECC) coding does not have to be the same for every carrier, nor does every carrier have to be used for every packet. Not only can the ECC be adjusted on a per carrier basis, the type of signal constellation used as well as the carrier to use them on can all be adjusted. Thus it is desirable for an optimal modulation mode to specify the identity of the carriers, the type of modulation, the robustness level of the ECC, etc. to use.

FIG. 1 is a block diagram illustrating an exemplary system for performing modulation adaption according to an embodiment. A sender 110 sends a packet 130 and a receiver 120 receives the packet 130. The sender and receiver may be any device that can send and/or receive network packets, signals, data, etc. over a network, such as a modem, transceiver, router, switch, hub, etc. The sender and receiver are coupled by a communication medium such as a low voltage power grid, cable, telephone line, Ethernet cable, etc. In some embodiments, the packet 130 comprises a preamble 132, a frame control header (FCH) 134, and an encoded packet data 136. The FCH 134 may also include its own cyclic redundancy check bits (FCH CRC) (not shown). In one embodiment, the encoded packet data 136 comprises a payload encoded with cyclic redundancy check bits (CRC) and/or ECC bits. The sender 110 sends the packet 130 to receiver 120. The receiver 120 processes the packet 130 and determines the optimal modulation parameters, such as the modulation type and/or error correction coding rate, for sending data through the communication channel 150 in accordance to the modulation adaption method disclosed below. The receiver then communicates different modulation parameters back to the sender 110 using one or more ECC packets 140. The sender 110 will, in turn, encode future packets according to these received modulation parameters.

Figure 2:
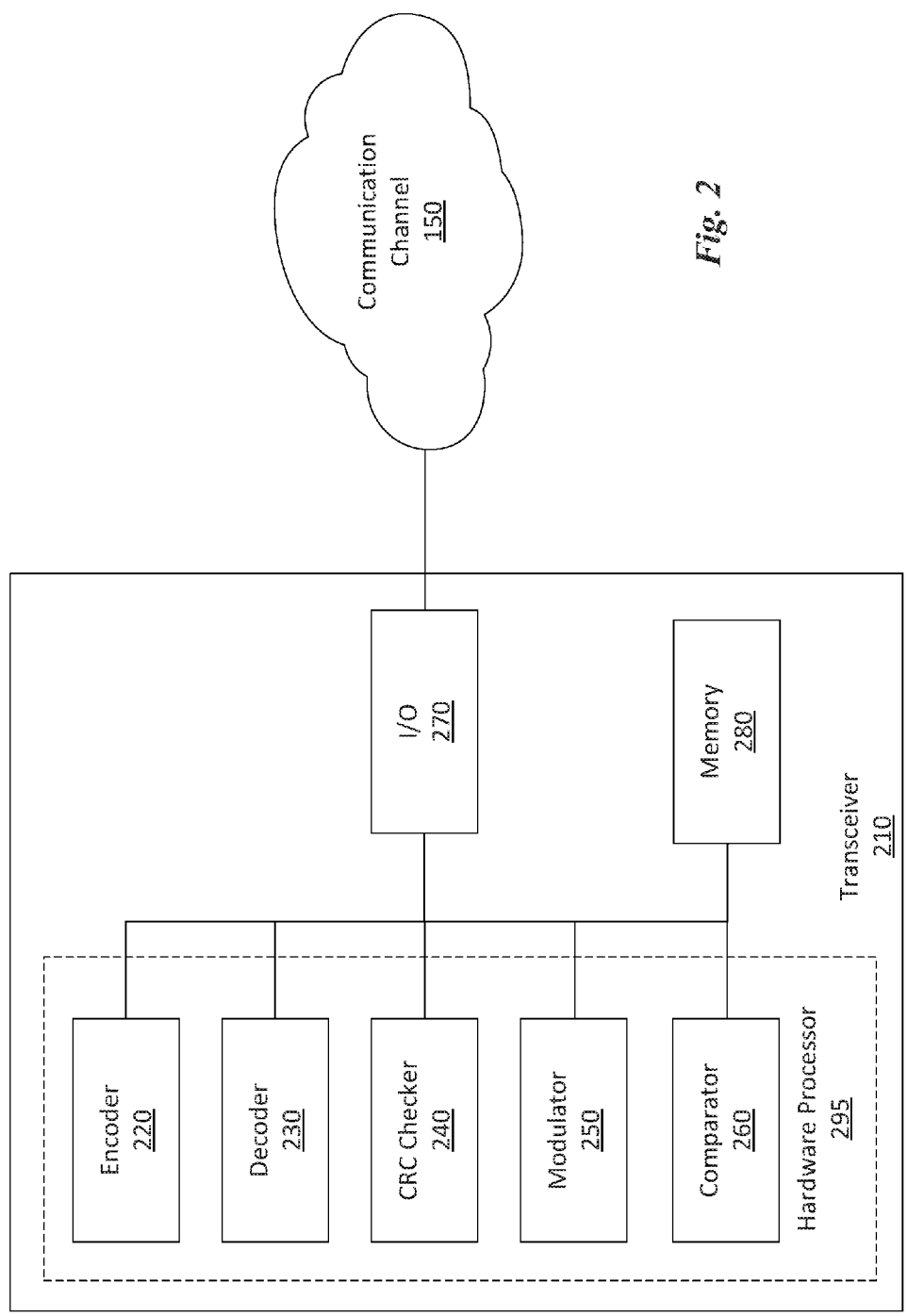
FIG. 2 is a block diagram illustrating an embodiment of the sender/receiver hardware for performing the modulation adaption method.

FIG. 2 is a block diagram illustrating an exemplary hardware implementation of the sender and receiver transceiver modem for performing the modulation adaption method according to an embodiment. FIG. 2 shows a transceiver 210 comprising an encoder 220, a decoder 230, a CRC checker 240, a modulator 250, a comparator 260, an Input/Output (I/O) hardware, and a memory 280. The encoder 220 encodes error detection and error correction codes into a bit pattern. For instance, the encoder 220 may calculate the CRC and/or ECC codes associated with a packet payload in accordance to a set of modulation adaption parameters and then integrate these calculated codes into the packet payload. The decoder 230, on the other hand, performs the reverse task of the encoder 220 by separating or extracting error correction/detection codes from an encoded bit pattern. For instance, the decoder 230 may process an encoded packet payload and extract from it the payload, CRC bits, and ECC bits. Moreover, the decoder 230 may further use the extracted error correction codes to correct any detected errors in the extracted payload. The extracted error detection codes (e.g., CRC bits), on the other hand, are used by the CRC checker 240 to perform error detection, such as a cyclic redundancy check, to detect the presence of errors in a bit pattern (e.g., an extracted packet payload). The modulator 250 converts the outgoing packets into carrier signals to be outputted onto the communication channel through I/O hardware 270, as well as translates incoming carrier signals received from the communication channel via I/O hardware 270 into bit patterns that makes up incoming packets. The comparator 260 compares two or more bit patterns, such as performing an exclusive OR (XOR) operation between the two bit patterns. The outgoing and incoming packets, along with CRC/ECC bits, as well as modulation adaption parameters may be stored in the memory 280. In some embodiments, one or more of these components are implemented as circuits within a hardware processor 295. In other embodiments, one or more of these components are implemented as code to be executed by a hardware processor of the transceiver 210 and store in the memory 280. The transceiver 210 is connected to the communication channel 150 through the I/O 270.

Figure 3:
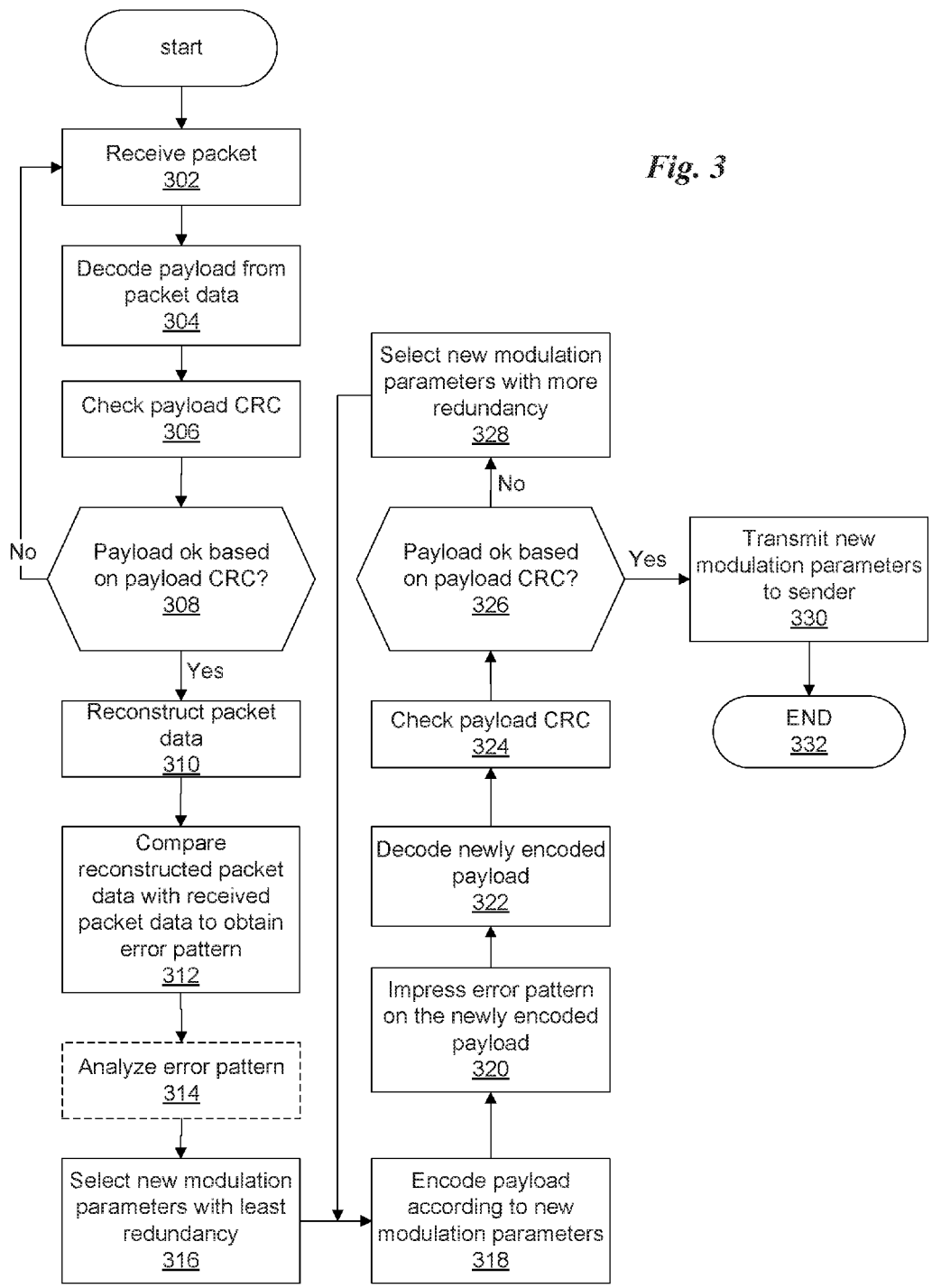
FIG. 3 is flow diagram illustrating an embodiment of the modulation adaption method.

FIG. 3 is a flow diagram illustrating an embodiment of modulation adaption. The modulation adaption is performed by a receiving device such as a receiving modem, etc. In some embodiments, instructions are stored and executed by the receiving device to direct performance of one or more aspects of this modulation adaption. For example, these instructions may be a part of a finite state machine. At 302, the receiver 120, through the I/O hardware 270, receives from the sender 110 an adaption packet 130 that was typically sent with a most robust modulation mode available over the communication channel 150. In some embodiments, the most robust modulation mode means using the maximum redundancy error coding on all carriers and/or using the highest energy difference between signal constellation states that the sending device is capable of producing. Using the maximum redundancy and energy difference provide the best chance for the receiver 120 to correctly receive, via I/O hardware 270, and decode, by decoder 230, the packet data through a noisy communication channel, such as over a low voltage power grid. The reason being that the higher the redundancy, the more the redundant data is available to the receiver for correcting errors and reconstructing the original bit pattern. Moreover, the larger the difference between signal constellation states, the more difficult it is for channel noise to be erroneously construed as part of the bit pattern and thereby corrupting the data. It is worth noting that since there is a high likelihood that the data in the adaption packet will be received and reconstructed in its entirety without errors, the method of the present invention allows useable payload data to be sent during the modulation adaption process, which not only contributes to the overall channel throughput but also reduces the overhead associated with modulation adaption.

In some embodiments, as noted above, a packet comprises a preamble 132, an FCH 134, and encoded packet data 136. The preamble 132 is used for detecting the presence of carriers and enabling synchronization to those carriers. The FCH 134 contains information and/or parameters of the modulation mode, as well as instructions on how to decode the payload from the packet data 136. The packet data 136 contains a payload encoded with the CRC and ECC associated with the payload. The FCH 134 also contains an FCH CRC for verifying the correctness of the FCH in the received adaption packet 130. After the decoder 230 decodes the FCH and the CRC checker 240 verifies that the FCH CRC is valid, the receiver may recognize from the FCH that the modulation mode used in transmitting the packet data is the most robust modulation mode available, such that maximum redundancy error coding and highest energy difference between signal constellation states are used. At 304, decoder 230 of the receiver decodes the packet data to obtain the payload using the decoding parameters that matches the high redundancy encoding done by the encoder of the sender 110. At 306, the payload CRC is verified by the CRC checker 240 to validate the correctness of the payload. At 308, if the payload CRC is invalid, thereby indicating the payload contains uncorrectable errors, the payload is discarded and the modulation adaption process ends until another adaption packet is received by the receiver. If, however, at 308 the payload CRC is deemed valid by the CRC checker 240, the receiver knows with high confidence that the decoded payload is error-free. Next, at 310, since both the payload and the modulation method are known by the receiver, the receiver can, through the encoder 220, reconstruct the original bit pattern of the packet data by re-encoding the extracted payload using the original high redundancy error coding. The bit pattern of reconstructed packet data should be identical to the error-free bit pattern of the packet data contained in the original packet before it was sent through communication channel. At 312, the bit pattern of the packet data in the received packet is compared with the error-free bit pattern of the reconstructed packet data, through the comparator 260, to obtain an error pattern. In one embodiment, the error pattern is derived by performing a bit by bit exclusive OR between the bit pattern of the packet data in the received packet and the bit pattern of the reconstructed packet data. This produces an error pattern of the same bit length as the packet data. Any zeros in the resulting error pattern represent error free data bits and the ones represent bits received in error. Once the error pattern is determined, it can be analyzed and used to select a new set of modulation parameters, such as a more efficient error encoding scheme with less redundancy or a channel carrier less prone to noise. In one embodiment, the errors in the error pattern are counted at 314 and then analyzed to determine, for instance, whether some carriers introduce more errors to the transmitted data than other carriers. In some implementations, the identified high error rate carriers may be excluded from subsequent transmission or modulation. Additional methods of error pattern analysis are described at the end of the specification. At 316, according to an embodiment, the receiver selects a more efficient set of modulation parameters, such as a new error encoding scheme (i.e., ECC) with the least amount of redundancy. Such an error encoding scheme would encode a higher byte count payload with lower redundancy than what was used before, while keeping the raw bit length of the encoded payload (i.e., packet data) approximately the same as that of the original received packet. This choice will result in higher throughput since the more bits in the packet data are used for payload and less bits are used for error correction and detection. At 318, the newly selected modulation parameters are applied on a known data pattern, for instance, encoding the payload with the newly selected error encoding scheme. At 320, the error pattern is impressed onto the newly encoded payload. According to an embodiment, the error pattern is XOR'd with the newly encoded payload which results in an encoded payload with simulated errors. This encoded payload with simulated errors contains the same bit error pattern as that of the received packet. The idea is that if a second packet was sent through the same communication channel as a first packet, the error pattern introduced into the second packet would be very similar to the error pattern in the first packet, irrespective of the packet content. Next, at 322, the receiver decodes the newly encoded payload with simulated errors using error decoder specified by the new modulation parameters. At 324, receiver checks whether the payload is decoded without errors by verifying the CRC. At 326, if the CRC is valid, then the newly selected set of modulation parameters is accepted as the optimal choice to be used by the sender for transmitting future packets over the communication channel. As such, the new selected set of modulation parameters is transmitted to the sender. If, on the other hand, the CRC fails at 326, the receiver modifies or selects a new set of modulation parameters with more redundancy at 328. The receiver iterates through 318-328 using modulation parameters with progressively more redundancy until the encoded payload with simulated errors can be decoded without errors. Thus either the first set of modulation parameters that successfully decodes the encoded payload without errors could be chosen or, more conservatively, a set of modulation parameters which provides slightly more redundancy can be chosen.

Many different modulation parameters may be modified or adjusted. According to an embodiment, different types of error encoding schemes are tried. Some with the same or similar redundancy but have different capabilities, such as the ability to handle larger bursts or dropouts. Once a set of modulation parameters, such as a particular error coding scheme, is chosen, the receiver communicates back to the transmitter with such information. The transmitter then stores the information and uses it to set modulation parameters in future transmission to the receiver. Packets sent under these revised modulation parameters will have a higher probability of being successfully received and decoded by the receiver, while still maintaining a high throughput.

Moreover, even after the initial optimal modulation parameters are set, the receiver may continue to adjust and fine tune these parameters based on the performance of subsequent packet transmissions. In one embodiment, the receiver calculates an overall error rate of the received bit stream across all carriers and estimates which error coding scheme is likely to correct all of the errors based on that overall error rate. In other embodiments, the error coding scheme may be chosen based on previously measured error rates for the type of channel being used. A table may be created to track the highest throughput ECC codes capable of properly decoding a packet of a given error rate.

In one embodiment, the receiver calculates the error rate for each carrier, and chooses not to use certain carriers if the error rate is beyond a certain threshold.

In another embodiment, the receiver is capable of identifying a consistently high error rate associated with certain symbols that may, for instance, be caused by a certain timing relationship these symbols have to the zero crossings of the AC power waveform present on the power grid. In such situation, the receiver may instruct the transmitter to exclude the data for these symbols at certain times and/or utilize a higher redundancy error encoding scheme for these symbols.

In yet another embodiment, certain characteristics of the error pattern may be monitored and the results used for determining how certain error encoding scheme will perform. For instance, a search may be conducted on the error pattern to find the maximum number of errors for every N bits, where N is the constraint length of the convolutional ECC being used. This information is useful because convolution ECC of a certain constraint length are known to fail when the number of errors within the constraint length exceeds a given threshold.

According to another embodiment, the receiver also measures the soft error metrics for each bit position in the received packet. Some decoders, such as the Viterbi type decoders, use weakness information collected by the receiver to determine the most likely bit pattern that was sent. For these types of decoders, the receiver must measure and track the relative signal strength of each bit position in the incoming packet rather than merely making a 0 or 1 bit determination. For instance, a scale of 0 to 7 may be implemented where a 7 is the strongest indication of a binary 1-bit with no weakness and 0 is the strongest indication of a binary 0-bit with no weakness. In an ideal situation where packets are transmitted through a noiseless communication channel, all the bits in a cleanly transmitted packet would measure either as a 7 (indicating a perfect binary 1-bit) or a 0 (indicating a perfect binary 0-bit). However, in the real world where noise exists in most, if not all, communication channels, the measured bits will likely fall somewhere between 0 and 7. As such, a bit with a measured signal strength of 4 would be the weakest signal that may be received and still be considered a binary 1-bit. This measured 1-bit would have an associated weakness of 3 because the measured signal strength (i.e., 4) is 3 counts away from the ideal 7 signal strength. Conversely, a measured signal strength of 3 would be the weakest signal that may be received and still indicates a binary 0-bit. This measured 0-bit would have an associated weakness of 3 since the measured signal strength (i.e., 3) is 3 counts away from the ideal 0 signal. The weakness associated with each bit position forms the weakness pattern of the received packet. The weakness pattern can be established from the reconstructed ideal logical bit values sent by the transmitter. In FIG. 4, the values in pattern 410 are the measure signal strength for each bit position in a received packet. The relative signal strength ranges from 0 to 7. As noted above, the measured signal strength determines the most likely binary bit value that was sent by the sender. A measured value between 0 and 3 indicates a binary bit 0 and a measure value between 4 and 7 indicates a binary bit 1. The values in 420 represent the reconstructed ideal logic bit values (i.e., the most likely binary bit values) that was sent by the sender. Next the reconstructed ideal logical bit values 420 are multiplied by 7 at each bit position, resulting in the values shown in 430. The resulting values from the multiplication are then subtracted by the values of the measured signal strength for each bit position to arrive at the values shown in 440. 440 provides, for each bit, the distance between the measure signal strength and the ideal logical bit value for each bit position. This is the weakness value at each bit. Finally, the absolute value at each bit position is taken and the result is the received weakness pattern from the transmitter 450.

This resulting weakness pattern can be used to further test and fine tune the candidate modulation scheme by adding noise to the bits in the test packet to be tested. For instance, for each bit location in the test packet, if the bit value of that location is a logical 1, the corresponding soft metric for that bit location is 7 minus the weakness pattern value of the corresponding bit location. As for each bit location in the test packet, if the bit value of that location is a logical 0, the corresponding soft metric for that bit location is 0 plus the weakness pattern value of the corresponding bit location. Once the weakness pattern is impressed on to the test packet, the weakened test packet is then decoded by the candidate modulation scheme to determine if all the errors can be corrected. Thus one can test different candidate carrier choices and ECC codes to find the highest throughput choice that can still be successfully decoded.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method comprising:
   receiving at a receiver hardware a first data packet containing data unknown to the receiver hardware, wherein the received first data packet is transmitted from a sender hardware over a communication channel in accordance to a first set of parameters, wherein the first set of parameters allows for reliable transmission despite noise in the communication channel;
   decoding and checking, by the receiver hardware, the received first data packet based on the first set of parameters to obtain an error free payload;
   encoding, by the receiver hardware, the error free payload in accordance to the first set of parameters to obtain an error-free copy of the first data packet;
   comparing, by the receiver hardware, the error-free copy of the first data packet with the received first data packet to obtain an error pattern;
   selecting, by the receiver hardware, a second set of parameters, wherein the second set of parameters is less robust than the first set of parameters;
   encoding, by the receiver hardware, the error free payload in accordance to the second set of parameters to obtain a second data packet;
   impressing, by the receiver hardware, the error pattern onto the second data packet to obtain a second data packet with simulated errors;
   decoding, by the receiver hardware, the second data packet with simulated errors in accordance to the second set of parameters; and wherein
   upon determining, by the receiver hardware, that the second data packet with simulated errors can be decoded without error, transmitting the second set of parameters to the sender hardware.

2. The method of claim 1, wherein the first set of parameters comprises a modulation mode.

3. The method of claim 2, wherein the modulation mode is a multi-carrier modulation mode.

4. The method of claim 2, wherein the modulation mode is a single-carrier modulation mode.

5. The method of claim 2, wherein the modulation mode is an orthogonal frequency-division multiplexing (OFDM) mode.

6. The method of claim 1, wherein the first set of parameters comprises an error detection rate.

7. The method of claim 1, wherein the communication channel is a low voltage power grid.

8. The method of claim 1, wherein the communication channel may introduce errors in the form of noise into data being transmitted over the communication channel.

9. The method of claim 1, wherein the receiver hardware is a transceiver modem capable of transmitting and receiving data packets over the communication channel.

10. The method of claim 1, wherein the sender hardware is a transceiver modem capable of transmitting and receiving data packets over the communication channel.

11. The method of claim 1, wherein the decoding the data packet comprises using an error correction code associated with the data packet to correct errors in the data packet.

12. The method of claim 1, wherein the checking the data packet comprises using an cyclic redundancy check (CRC) associated with the data packet to detect presence of errors in the data packet.

13. The method of claim 1, wherein selecting the second set of parameters comprises counting errors in the error pattern to determine which channels are more prone to errors.

14. The method of claim 1, wherein comparing the error-free copy of the first data packet with the received first data packet to obtain an error pattern comprises performing an exclusive OR (XOR) operation between at least a portion of the error-free copy of the first data packet and at least a portion of the received first data packet.

15. The method of claim 14, wherein the XOR operation is performed between the error-free copy of the first data packet and the received first data packet at every bit position.

16. The method of claim 1, wherein impressing the error pattern onto the second data packet comprises performing an exclusive OR (XOR) operation between at least a portion of the second data packet and at least a portion of the error pattern.

17. The method of claim 16, wherein the XOR operation is performed between the second data packet and the error pattern at every bit position.

18. The method of claim 1, wherein the error-free copy of the first data packet is of the same length as the received first data packet but without errors introduced into the received first data packet by the communication channel.

19. A apparatus comprising:
input/output (I/O) circuitry to receive a first data packet containing data unknown to the apparatus, wherein the received first data packet is transmitted from a sender over a communication channel in accordance to a first set of parameters, the first set of parameters allowing for reliable transmission despite noise in the communication channel;
decoder circuitry to decode the received first data packet based on the first set of parameters to generate an error free payload;
encoder circuitry to encode the error free payload in accordance to the first set of parameters to generate an error-free copy of the first data packet and to encode the error free payload in accordance to a second set of parameters to generate a second data packet, the second set of parameters being less robust than the first set of parameters;
comparator circuitry to compare the error-free copy of the first data packet with the received first data packet to obtain an error pattern;
wherein the encoder circuitry is further to impress the error pattern onto the second data packet to generate a second data packet with simulated errors and the decoder circuitry is to further decode the second data packet with simulated errors in accordance to the second set of parameters; and wherein upon the comparator circuitry determining that the second data packet with simulated errors can be decoded without error, the I/O circuitry is to transmit the second set of parameters to the sender.

20. The apparatus of claim 19, wherein the first set of parameters comprises a modulation mode.

21. The apparatus of claim 20, wherein the modulation mode is a multi-carrier modulation mode.

22. The apparatus of claim 20, wherein the modulation mode is a single-carrier modulation mode.

23. The apparatus of claim 20, wherein the modulation mode is an orthogonal frequency-division multiplexing (OFDM) mode.

24. The apparatus of claim 19, wherein the first set of parameters comprises an error detection rate.

25. The apparatus of claim 19, wherein the communication channel is a low voltage power grid.

\* \* \* \* \*